(12) United States Patent
Shibata et al.

(10) Patent No.: US 10,762,264 B2
(45) Date of Patent: Sep. 1, 2020

(54) HIGH-LEVEL SYNTHESIS DEVICE, HIGH-LEVEL SYNTHESIS METHOD, AND PROGRAM RECORDING MEDIUM

(71) Applicant: NEC CORPORATION, Tokyo (JP)

(72) Inventors: Seiya Shibata, Tokyo (JP); Takashi Takenaka, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 119 days.

(21) Appl. No.: 16/070,328

(22) PCT Filed: Jan. 31, 2017

(86) PCT No.: PCT/JP2017/003339
§ 371 (c)(1),
(2) Date: Jul. 16, 2018

(87) PCT Pub. No.: WO2017/135228
PCT Pub. Date: Aug. 10, 2017

(65) Prior Publication Data
US 2019/0034570 A1    Jan. 31, 2019

(30) Foreign Application Priority Data
Feb. 1, 2016   (JP) ................... 2016-017052

(51) Int. Cl.
*G06F 30/3312*   (2020.01)
*G06F 30/327*    (2020.01)
*G06F 119/12*    (2020.01)

(52) U.S. Cl.
CPC ........ *G06F 30/3312* (2020.01); *G06F 30/327* (2020.01); *G06F 2119/12* (2020.01)

(58) Field of Classification Search
CPC ............. G06F 17/5031; G06F 17/5045; G06F 17/505; G06F 17/5054; G06F 2217/66;
(Continued)

(56) References Cited

U.S. PATENT DOCUMENTS

| 2001/0047509 A1* | 11/2001 | Mason ................ G06F 17/5054 716/116 |
| 2007/0083831 A1* | 4/2007 | Hamilton ............ G06F 17/5045 716/105 |
| 2017/0126426 A1* | 5/2017 | Giaconi .............. G06F 17/5054 |

FOREIGN PATENT DOCUMENTS

| JP | 2003-091565 A | 3/2003 |
| JP | 2004-054641 A | 2/2004 |
| JP | 2012-022613 A | 2/2012 |

OTHER PUBLICATIONS

International Search Report for PCT/JP2017/003339 dated May 16, 2017 [PCT/ISA/210].

(Continued)

*Primary Examiner* — Paul Dinh
(74) *Attorney, Agent, or Firm* — Sughrue Mion, PLLC

(57) ABSTRACT

Provided is for reducing access latency. A high-level synthesis device includes feature quantity obtaining unit and implementation determination unit. Feature quantity obtaining unit obtains an access feature quantity including a feature quantity relating to communication between a plurality of modules by analyzing an access pattern in communication between the plurality of modules. Implementation determination unit determines an implementation method for communicating between the plurality of modules based on the obtained access feature quantity.

18 Claims, 20 Drawing Sheets

(58) Field of Classification Search
CPC . G06F 30/327; G06F 30/3312; G06F 2219/12
USPC .......................................... 716/108, 116, 104
See application file for complete search history.

(56) References Cited

OTHER PUBLICATIONS

Written Opinion for PCT/JP2017/003339 dated May 16, 2017 [PCT/ISA/237].

* cited by examiner

| CANDIDATE NUMBER | IMPLEMENTATION CANDIDATE NAME | | ACCESS FEATURE QUANTITY | |
|---|---|---|---|---|
| | COMMUNICATION PATH CANDIDATE NAME | I/F CANDIDATE NAME | FEATURE TYPE | RANGE |
| 1 | FIFO | FIFO_IF_SW_1 | A | [0.0, 0.1) |
| 2 | FIFO | FIFO_IF_SW_2 | A | [0.1, 1.0] |
| 3 | FIFO | FIFO_IF_HW_1 | B | [0, 0.5) |
| 4 | FIFO | FIFO_IF_HW_2 | B | [0.5, 1.0] |
| 5 | MEM | MEM_IF_SW_1 | C | [0, 1.0) |
| 6 | MEM | MEM_IF_HW_1 | C | [20, 100] |
| 7 | MEM | MEM_IF_HW_2 | C | [10, 20) |
| 8 | REG | REG_IF_SW_1 | D | [100, 300) |
| 9 | REG | REG_IF_HW_1 | E | ALL |

Note: Candidate 8 shows feature type E with range ALL; candidate 9 shows feature type E with range ALL.

Fig. 13

315 SYNTHESIS RESULT DETAILS

| SYNTHESIS METHOD | ACCESS FEATURE QUANTITY SERVING AS BASIS OF DETERMINATION | | EFFECT (ACCESS LATENCY) |
|---|---|---|---|
| | FEATURE TYPE | FEATURE QUANTITY | |
| FIFO_I/F_SW_1 | A | 0.01 | N[ns] |
| FIFO_I/F_HW_1 | B | 0.02 | N[ns] |
| SW_HW_FIFO | A | 0.01 | N[ns] |
| | B | 0.02 | |

317 ACCESS FEATURE QUANTITY

| FEATURE TYPE | FEATURE QUANTITY |
|---|---|
| A | 0.01 |
| B | 0.02 |

318 ACCESS FEATURE QUANTITY

| CANDIDATE NAME | FEATURE TYPE | RANGE OF FEATURE QUANTITY | EFFECT (ACCESS LATENCY) |
|---|---|---|---|
| FIFO_I/F_SW_2 | A | [0.1, 1.0] | L[ns] |
| FIFO_I/F_HW_1 | B | [0.5, 1.0] | M[ns] |

HIGH-LEVEL SYNTHESIS DEVICE, HIGH-LEVEL SYNTHESIS METHOD, AND PROGRAM RECORDING MEDIUM

CROSS REFERENCE TO RELATED APPLICATIONS

This application is a National Stage of International Application No. PCT/JP2017/003339 filed Jan. 31, 2017, claiming priority based on Japanese Patent Application No. 2016-017052 filed Feb. 1, 2016, the disclosure of which is incorporated herein by reference in its entirety.

TECHNICAL FIELD

The present invention relates a high-level synthesis device, a high-level synthesis method, and a program recording medium.

BACKGROUND ART

A high-level synthesis device is a device that generates synthesis data including a description of an implementation format determined based on input data, when data including a description for realizing a function desired by the user is input. The description contained in the input data is expressed by, such as, a highly abstract model language, a programming language. The description about the implementation format included in the synthesis data is, for example, a description about more specific content than the content about the description included in the input data, and shows a detailed configuration about the circuit. Such a high-level synthesis device is sometimes generally referred to as a high-level synthesis system.

In the present application, it is assumed that a module means one or more groups (one unit, lump) used for realizing a predetermined function, which is constituted by at least one of software and hardware.

Various types of high-level synthesis devices for circuit modules have been proposed. For example, PTL 1 discloses an automatic synthesis device of an inter-module interface corresponding to a high-level synthesis device for a circuit module.

The automatic synthesis device disclosed in PTL 1 analyzes the write sequence and read sequence of the module-to-module interface circuit, obtains the write delay, and analyzes the lifetime of the variables of the variable array of the inter-module interface. Then, the automatic synthesis device derives a degenerated variable set from the set of each variable array, solves the variable sharing problem, and assigns each variable to the memory. The automatic synthesis device synthesizes the circuit based on the assignment of this variable.

CITATION LIST

Patent Literature

[PTL 1] Japanese Patent Laid-Open No. 2004-54641

SUMMARY OF INVENTION

Technical Problem

However, in PTL 1, a circuit module is adopted as a module to be synthesized, and the purpose is to reduce the memory capacity used in the interface accessed from the circuit module. Therefore, with the automatic synthesis device described in PTL 1, it is difficult to respond to the request of synthesizing circuits with short access time (access latency) to the interface.

In general, there are few options for access methods in circuit modules. On the other hand, in an interface between a plurality of modules including a software module, generally there are almost numerous number of candidates of access methods to the interface, and access time may be different for each candidate. As PTL 1 employs a circuit module as a module to be synthesized as described above, it is unlikely to encounter the problem of reducing the access latency to the interface between a plurality of modules.

The present invention has been made in view of the above circumstances, and it is an object of the present invention to provide a high-level synthesis device and the like capable of reducing access latency.

Solution to Problem

A high-level synthesis device relating to first aspect of the present invention includes:

a feature quantity obtaining means for obtaining an access feature quantity including a feature quantity relating to communication between a plurality of modules by analyzing an access pattern in communication between the plurality of modules; and an implementation determination means for determining an implementation method for communicating between the plurality of modules based on the obtained access feature quantity.

A high-level synthesis method relating to second aspect of the present invention includes:

obtaining an access feature quantity including a feature quantity for communication between a plurality of modules by analyzing the access pattern in the communication between the plurality of modules; and determining the implementation method for communication between the plurality of modules based on the obtained access feature quantity.

A program relating to third aspect of the present invention causes a computer to function as:

feature quantity obtaining means for obtaining an access feature quantity including a feature quantity for communication between a plurality of modules by analyzing the access pattern in the communication between the plurality of modules; and implementation determination means for determining the implementation method for communication between the plurality of modules based on the obtained access feature quantity.

Advantageous Effects of Invention

According to the present invention, it is possible to reduce access time (access latency) in communication among a plurality of modules.

BRIEF DESCRIPTION OF DRAWINGS

FIG. 3 shows an example of candidate data.

FIG. 13 shows an example of a configuration of a synthesis result screen.

DESCRIPTION OF EMBODIMENTS

An example embodiment of the present invention will be described with reference to the drawings.

First Example Embodiment

High-level synthesis device 100 according to the first example embodiment of the present invention is a device that determines (synthesis) an implementation method suitable for communication based on an access pattern of communication between a plurality of modules, and outputs synthesis data indicating this determined implementation method.

Here, the plurality of modules is a module that communicates with an interface implemented in each module via a communication path between the modules, and in the present example embodiment, the plurality of modules includes a software module and a hardware module. The Software module is a module realized by software. The hardware module is a module realized by hardware.

It should be noted that the implementation of each of the plurality of modules, such as whether the plurality of modules is realized by software, hardware, or on which device is operated, is not limited to the above-described ones, and may be appropriately selected.

Figure 1:
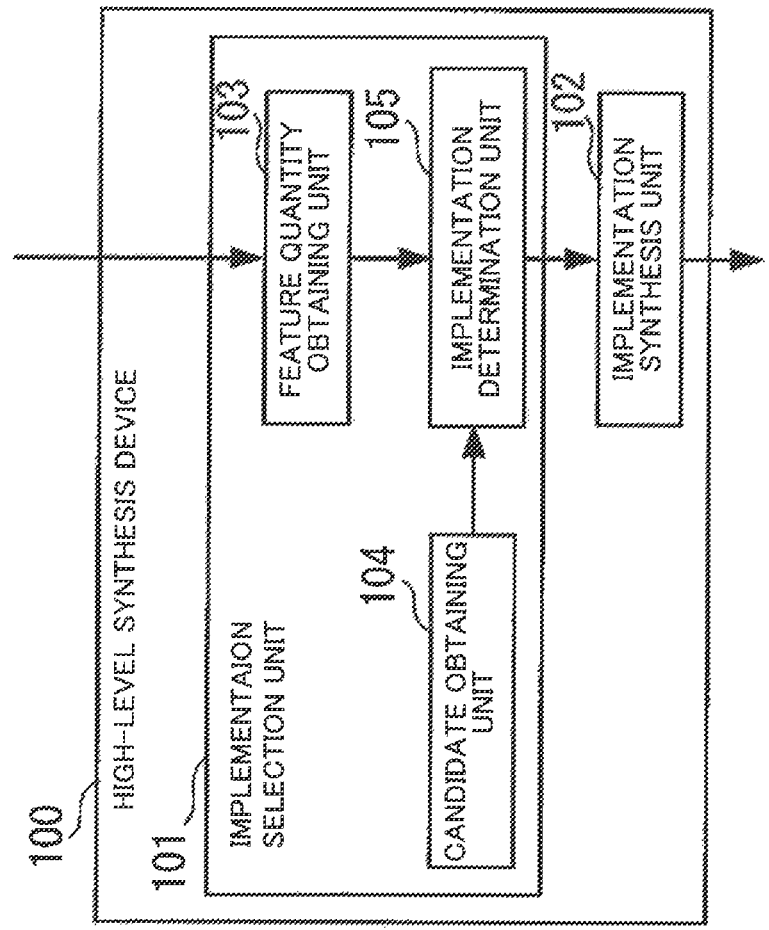
FIG. 1 illustrates a functional configuration of a high-level synthesis device according to a first example embodiment of the present invention.

Functionally, high-level synthesis device 100 has implementation selection unit 101 and implementation synthesis unit 102, as shown in FIG. 1.

Implementation selection unit 101 is a processing ing unit that selects an implementation method suitable for the communication based on an access pattern of communication between a plurality of modules, and includes feature quantity obtaining unit 103, candidate obtaining unit 104, and implementation determination unit 105.

Feature quantity obtaining unit 103 analyzes the access pattern of communication between a plurality of modules to obtain an access feature quantity indicative of features related to communication between a plurality of modules.

More specifically, when feature quantity obtaining unit 103 obtains input data indicating the execution profile of each of the plurality of modules from the outside, feature quantity obtaining unit 103 analyzes the access pattern based on the execution profile indicated by the input data, thereby obtaining the access feature quantity.

The execution profile indicated by the input data is a profile relating to communication among a plurality of modules, and is, for example, an execution log obtained as a result when a plurality of modules to be subjected to the processing of determining the implementation method (high-level synthesis processing described later) communicate using the communication path.

The execution log may be obtained by various methods, but it may be obtained by operating software on all modules, for example. In this case, for example, the execution log includes access time, data transmission amount, and data reception amount when communicating using the communication path. Further, for example, the input data includes a character string indicating each of the access time and the data transmission and reception amounts.

The access feature quantity includes, for example, a feature type which is a type of a feature relating to communication between a plurality of modules and a feature quantity corresponding to the feature type. Examples of the feature type include communication path access frequency (access frequency at each of the receiving side and the transmitting side), a change with time of the communication path access frequency (frequency variation with time at each of the receiving side and the transmitting side), difference in communication path access frequency between modules, communication path I/F access latency (access latency at each of the receiving side and the transmitting side; it should be noted that I/F is an abbreviation for the interface, the same applies below), communication path I/F access latency difference, bulk access amount, and a combination of these access patterns.

Specifically, for example, when the feature type is the communication path access frequency, the reciprocal of the average value of the time intervals at which each module communicates using the communication path is adopted as the feature quantity.

For example, when the feature type is the change with time of communication path access frequency, the amount of change in the frequency of communication by each module using a communication path with constant time intervals is adopted as the feature quantity.

For example, when the feature type is a difference in the communication path access frequencies between modules, the difference in frequency with which each module communicates using the communication path is adopted as the feature quantity.

For example, when the feature type is the communication path I/F access latency, the access time (access latency) to the interface is adopted as the feature quantity.

For example, in the case where the feature type is the difference in the communication path I/F access latency, the difference in the access latency to the interface is adopted for the feature quantity.

For example, if the feature type is the difference in the communication path I/F access latency, the difference in the access latency to the interface is adopted for the feature quantity.

For example, when the feature type is an access pattern, the combination of the feature quantities exemplified above is adopted as the feature quantity.

It is to be noted that a fixed value as a feature quantity corresponding to each of a one or more specific feature types and one feature type or a plurality of feature types may be adopted as the access feature quantity. The feature quantity in this case may be determined beforehand experimentally.

Candidate obtaining unit 104 obtains and outputs a plurality of implementation candidates which are candidates for implementation method for communicating among a plurality of modules. The plurality of implementation candidates obtained by candidate obtaining unit 104 may have different performances depending on the access feature quantity.

Here, an implementation method for communicating between a plurality of modules includes a communication path between a plurality of modules and an interface implemented in each of the plurality of modules. Correspondingly, the implementation candidate includes a communication path candidate which is a candidate of configuration for realizing the communication path and a candidate of an access method to the communication path, i.e., an I/F candidate which is a candidate for the interface.

Specific examples of the communication path candidate include, such as, a register circuit, a memory area, a memory circuit, a FIFO (First In, First Out) structure (ring buffer structure), a FIFO circuit. Then, for example, when a FIFO circuit is adopted as a communication path between modules performing communication, candidate determining unit 104 may obtain one or a plurality of I/F candidates corresponding to the FIFO circuit.

Figure 2:
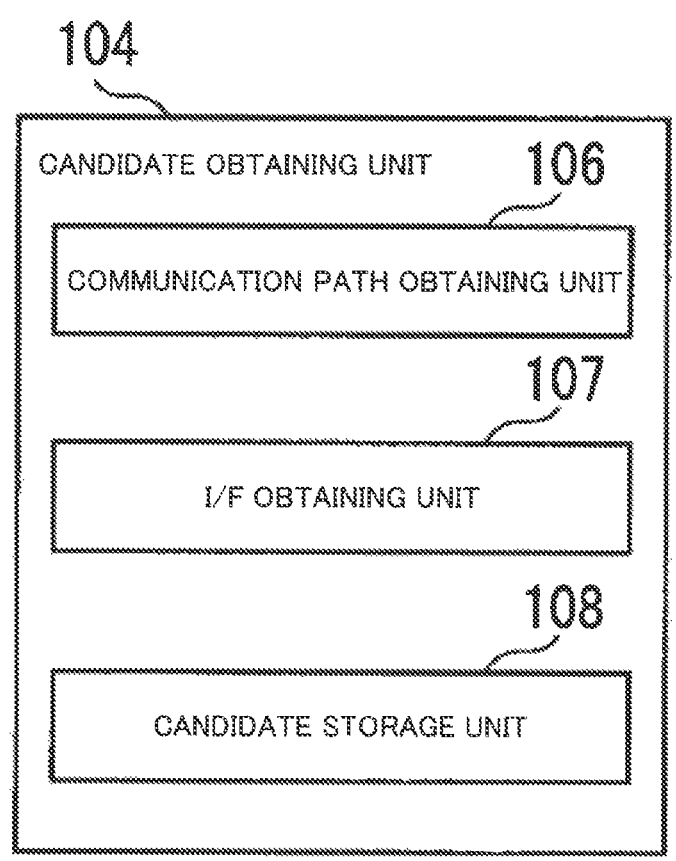
FIG. 2 is a diagram showing a configuration of a candidate obtaining unit according to the first example embodiment.

As shown in FIG. 2, candidate obtaining unit 104 includes communication path obtaining unit 106, I/F obtaining unit 107, and candidate storage unit 108.

Communication path obtaining unit 106 is a processing ing unit that obtains a communication path candidate, and corresponds to a first obtaining unit to obtain the candidate of the communication path. I/F obtaining unit 107 is a processing ing unit that obtains the I/F candidate, and corresponds to a second obtaining unit that gets the candidate of the interface.

For example, candidate storage unit 108 stores candidate data 109 (see FIG. 3) indicating implementation candidate in advance. As illustrated in FIG. 3, candidate data 109 is data in which a candidate number, an implementation candidate name, and an access feature quantity are associated.

The candidate number is a unique number assigned to each implementation candidate. The implementation candidate name is a name assigned to each implementation candidate, and includes a communication path candidate name which is a name given to the communication path candidate, an I/F candidate name which is a name given to the I/F candidate. The access feature quantity indicates an access feature quantity corresponding to each implementation candidate and includes a feature type and a range of a feature quantity corresponding to the feature type.

Each of A to E of the feature type shown in FIG. 3 is one of the exemplified feature types, for example. Symbols "[x", "x]" and "(x", "x)" included in the "range" column of FIG. 3 respectively indicate "x or more", "x or less" and "larger than x", "smaller than x", where x represents a numerical value.

Communication path obtaining unit 106 and I/F obtaining unit 107 according to the present example embodiment obtains the communication path candidate and the I/F candidate by referring to the candidate data stored by the candidate storage unit 108. It should be noted that the candidate data may be obtained from outside via a network, for example.

Returning to FIG. 1, implementation determination unit 105 determines and outputs an implementation method for communicating between a plurality of modules based on the access feature quantity obtained by the feature quantity obtaining unit 103.

Specifically, implementation determination unit 105 determines, for example, one implementation method, using an access feature quantity included in candidate data 109 as a criterion, from among a plurality of implementation candidates obtained by the candidate obtaining unit 104, on the basis of the obtained access feature quantity. Then, implementation determination unit 105 outputs information for specifying the determined implementation method. The information for specifying the implementation method is, for example, a combination of one or more of a candidate number, a communication path candidate name, and an I/F candidate name corresponding to the determined implementation method.

The determination criterion adopted by the implementation determination unit 105 to determine the implementation method is not limited to the access feature quantity included in the candidate data 109.

For example, implementation determination unit 105 may obtain information for specifying an implementation method based on an instruction from the user, and preferentially adopt the obtained information as a determination criterion for determining an implementation method. Further, for example, implementation determination unit 105 may obtain information indicating the implementation form of the module to be subjected to the high-level synthesis processing from the outside, and cause the obtained information to be included in a determination criterion for determining the implementation method.

Figure 4:
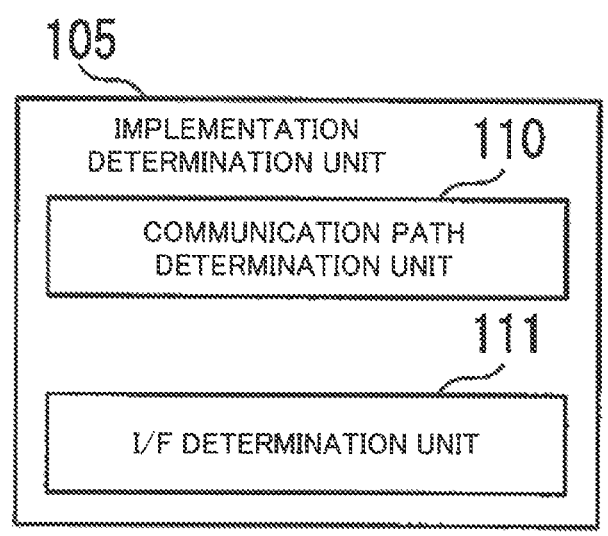
FIG. 4 shows a configuration of an implementation determination unit according to the first example embodiment.

As described above, the implementation method includes a communication path between a plurality of modules and an interface implemented in each of the plurality of modules. As shown in FIG. 4, relating to the communication path and the interface, which are elements of the implementation method, implementation determination unit 105 has communication path determination unit 110 and I/F determination unit 111. Communication path determination unit 110 determines a communication path between a plurality of modules. I/F determination unit 111 determines the interface to be implemented in each of the plurality of modules.

Returning to FIG. 1 again, implementation synthesis unit 102 generates synthesis data indicating the implementation method determined by the implementation determination unit 105 and outputs it to the outside.

The configuration of the high-level synthesis device 100 according to the first example embodiment of the present invention has been described. The operation of the high-level synthesis device 100 according to the present example embodiment will now be described.

The high-level synthesis device 100 according to the present example embodiment executes a high-level synthesis processing (see FIG. 5), for example, upon receiving an instruction from the user. The high-level synthesis processing is a processing of determining an implementation method suitable for the communication based on an access pattern of communication between a plurality of modules. In the present example embodiment, the high-level synthesis processing further includes a processing of generating and outputting synthesis data indicating the determined implementation method.

Figure 5:
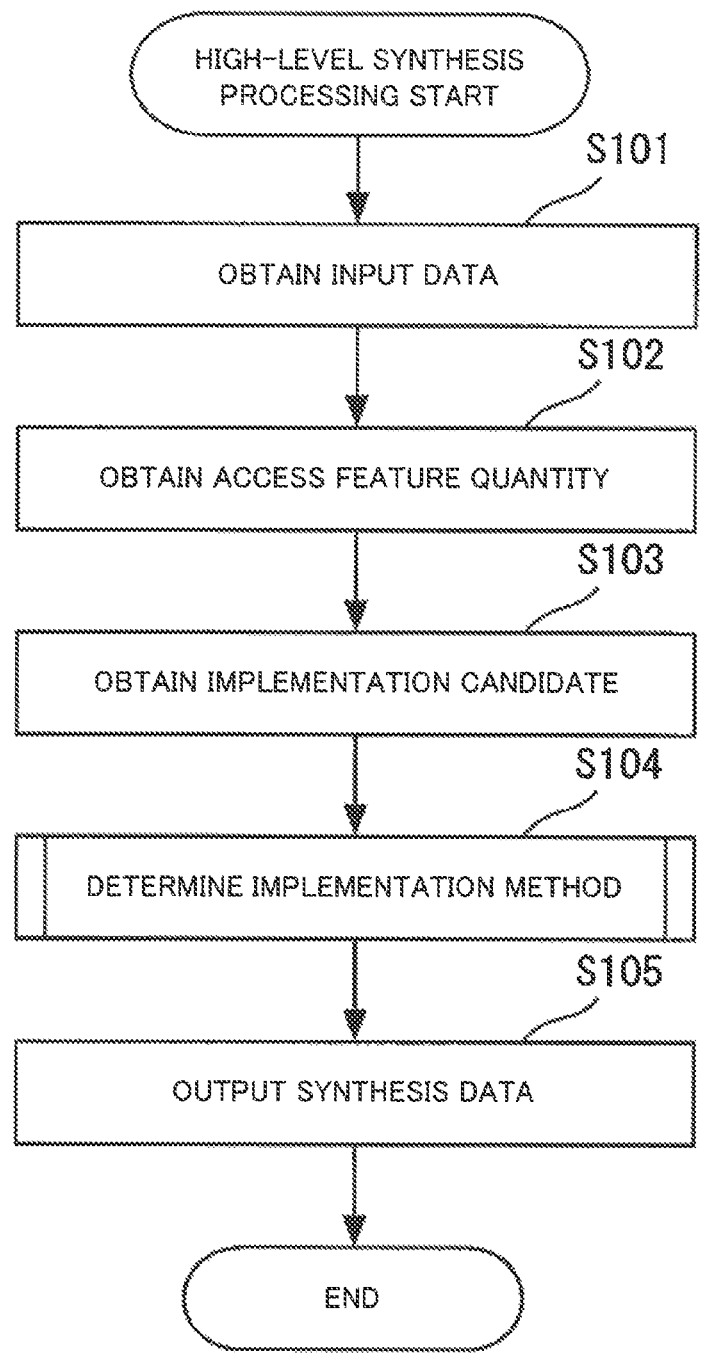
FIG. 5 is a flowchart showing a flow of high-level synthesis processing ing according to the first example embodiment.

As shown in FIG. 5, feature quantity obtaining unit 103 obtains input data indicating the execution profile of each of a plurality of modules from the outside (step S101).

Feature quantity obtaining unit 103 analyzes the access pattern based on the execution profile indicated by the input data obtained in step S101, thereby obtaining the access feature quantity (step S102). For example, feature quantity obtaining unit 103 analyzes the access pattern, thereby calculating the access feature quantity.

Candidate obtaining unit 104 obtains the implementation candidate included in the candidate data 109 (step S103). Specifically, communication path obtaining unit 106 obtains the communication path candidate from among the implementation candidates included in the candidate data 109. In addition, I/F obtaining unit 107 obtains the I/F candidate out of the implementation candidates included in candidate data 109.

Implementation determination unit 105 executes an implementation method determination processing (step S104) of determining an implementation method for communicating among a plurality of modules based on the access feature quantity obtained in step S102.

Figure 6:
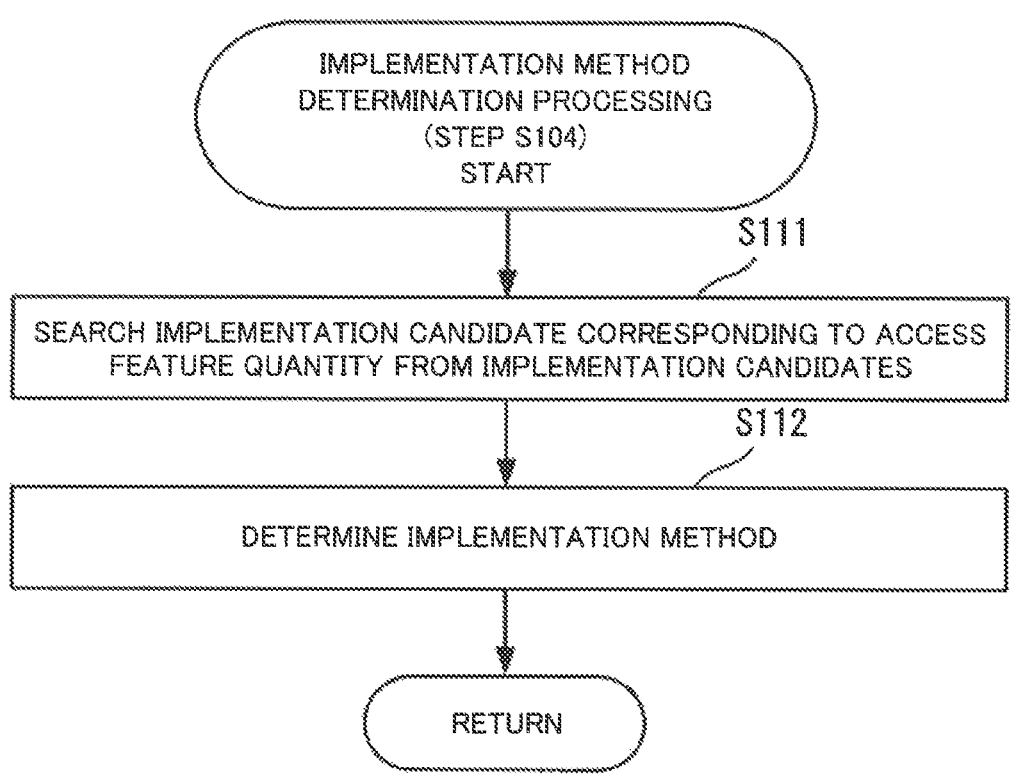
FIG. 6 is a flowchart showing details of an implementation method determination processing ing shown in FIG. 5.

Specifically, in the implementation method determination processing (step S104), as shown in FIG. 6, implementation determination unit 105 searches the implementation candidate corresponding to the obtained access feature quantity from the implementation candidate obtained in step S103 (step S111).

For example, implementation determination unit 105 extracts an implementation candidate having an access feature quantity including the same feature type as the obtained access feature quantity from the implementation candidate obtained in step S103. Then, implementation determination unit 105 searches an implementation candidate in which an access feature quantity including a feature quantity included in the obtained access feature quantity as a range is associated, from among the extracted implementation candidates.

Specifically, when the feature type included in the obtained access feature quantity is "A" and the implementation candidate is the one shown in FIG. 3, implementation determination unit 105 extracts an implementation candidate of which candidate number is "1" and an implementation candidate of which candidate number is "2". Then, when the feature quantity included in the obtained access feature quantity is "0.1", implementation determination unit 105 obtains an implementation candidate of which candidate number is "2" as a search result.

Implementation determination unit 105 determines an implementation method by determining the implementation candidate obtained as a result of the search in step S111 as an implementation method for communicating among a plurality of modules (step S112), and returns back to a high-level synthesis processing (see FIG. 5).

Implementation synthesis unit 102 generates and outputs synthesis data indicating the implementation method determined in step S104 (step S105), thereby ending the high-level synthesis processing.

As explained above, in the first example embodiment of the present invention, an access feature quantity is obtained by analyzing an access pattern in communication among a plurality of modules. Based on the obtained access feature quantity, an implementation method for communicating among the plurality of modules is determined. As a result, it is possible to determine an implementation method suitable for an access pattern in communication between a plurality of modules so as to shorten the access latency. Therefore, it is possible to reduce the access latency in communication between a plurality of modules.

In addition to access latency, these performance improvements such as improvement of throughput, miniaturization of implementation area, reduction of power consumption, can be achieved.

In the present example embodiment, multiple modules subject to high-level synthesis processing include a software module. In the software module, generally, unlike the circuit module, i.e., the hardware module, there are almost a numerous number of candidates for the access method to the interface, and the access time may be different for each candidate. In the present example embodiment, the access pattern is analyzed based on the execution profile, and therefore, it is possible to determine the implementation method suitable for the access pattern in the communication between the plurality of modules so as to shorten the access latency. Therefore, it is possible to reduce the access latency, especially in communication between a plurality of modules including a software module.

For example, a case is assumed in which the connection method between two modules communicating is determined, and it is assumed that the transmission side, which is one of the modules, is the software module, and the reception side, which is the other of the modules, is the hardware module. It is assumed that the access frequency X of the transmission side is 0.1, the access frequency Y of the reception side is 0.2, and the access frequency X of the software module of the transmission side is less than the access frequency Y of the hardware module of the reception side, and that there is a stationary difference in these access frequencies.

At this time, for example, the implementation method of the high-speed interface may be determined by the software module based on the access frequency difference (Y−X). As a result, it is possible to improve the performance related to the communication as described above.

It may be possible to determine an implementation method of an interface with low speed but having a small area with a hardware module. This makes it possible to reduce the circuit area.

Furthermore, for example, when a FIFO circuit is adopted as the communication path, an implementation method with a smaller number of FIFO stages may be determined by using the fact that the access frequency of the reception side always increases. This makes it possible to reduce the circuit area for implementation and memory capacity.

Second Example Embodiment

In the present example embodiment, when a plurality of implementation methods is selected from the implementation candidate based on the obtained access feature quantity, the high-level synthesis device evaluates each of the selected implementation methods in advance with regard to the performance of the communication determined in advance. Then, the high-level synthesis device determines the implementation method based on the evaluated result.

Figure 7:
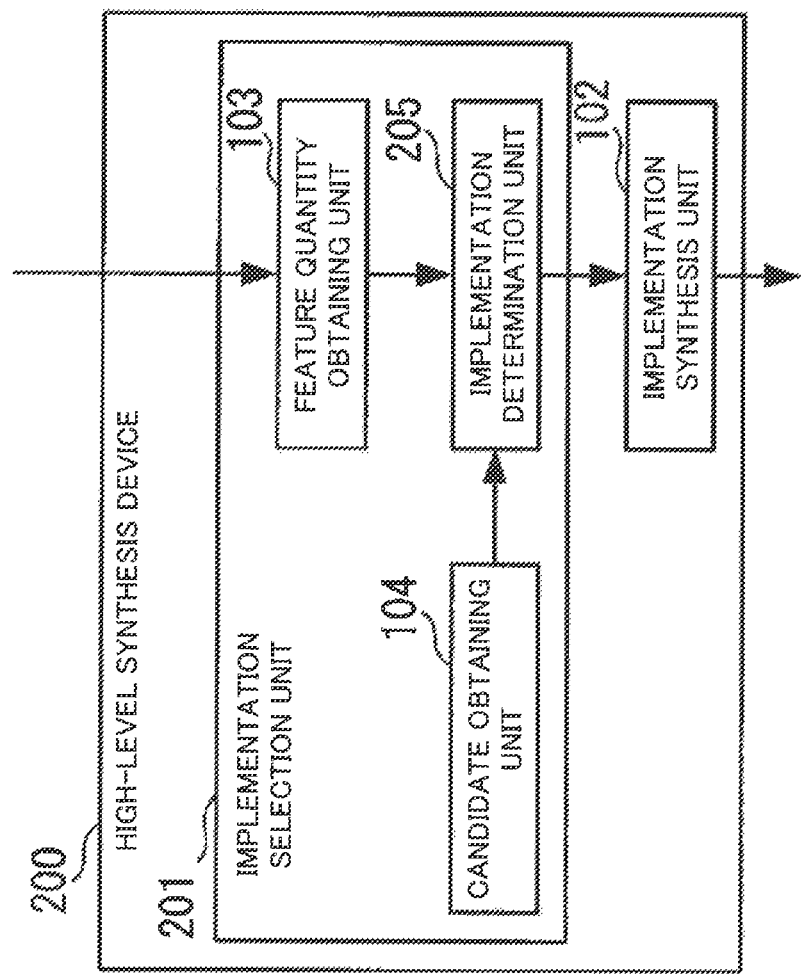
FIG. 7 is a diagram showing a functional configuration of a high-level synthesis device according to a second example embodiment of the present invention.

As shown in FIG. 7, high-level synthesis device 200 according to the present example embodiment includes an implementation selection unit 201 in place of implementation selection unit 101 according to the first example embodiment and implementation synthesis unit 102 similar to the first example embodiment. Implementation selection unit 201 according to the present example embodiment has the same configuration as implementation selection unit 101 according to the first example embodiment except that it has implementation determination unit 205 instead of the implementation determination unit 105 according to the first example embodiment.

Like implementation determination unit 105 according to the first example embodiment, implementation determination unit 205 determines and outputs an implementation method for communicating between a plurality of modules based on the access feature quantity obtained by feature quantity obtaining unit 103.

When multiple implementation methods are selected from implementation candidate on the basis of the access feature quantity, implementation determination unit 205 according to the present example embodiment evaluates each of the selected implementation methods with respect to the performance of a predetermined communication. Then, implementation determination unit 205 determines the implementation method based on the evaluated result.

Figure 8:
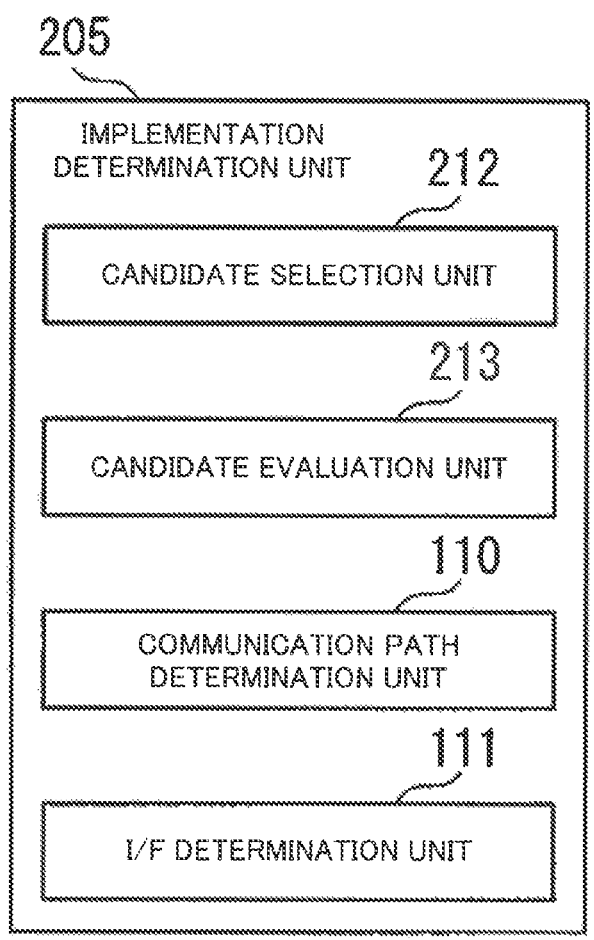
FIG. 8 shows a configuration of an implementation determination unit according to the second example embodiment.

Specifically, as shown in FIG. 8, implementation determination unit 205 includes candidate selection unit 212, candidate evaluation unit 213, communication path determination unit 110, and I/F determination unit 111.

Based on the obtained access feature quantity, candidate selection unit 212 selects an implementation method from the plurality of implementation candidates obtained by the candidate obtaining unit 104, using the access feature quantity included in the candidate data 109 as a determination criterion.

Here, the method for selecting the implementation method is similar to the method in which implementation determination unit 105 according to the first example embodiment determines the implementation method using the access feature quantity included in candidate data 109 as the determination reference. In the present example embodiment, a plurality of implementation methods may be selected by candidate selection unit 212.

Candidate evaluation unit 213 evaluates each of the plurality of selected implementation methods with respect to the performance of a predetermined communication when a plurality of implementation methods are selected from among implementation candidates.

Communication path determination unit 110 and I/F determination unit 111 respectively determine the communication path and the interface on the basis of the result evaluated by candidate evaluation unit 213. If there is only one implementation method selected from the implementation candidates, each of communication path determination unit 110 and I/F determination unit 111 selects one of the communication path and the interface. Therefore, in this case, candidate evaluation unit 213 may or may not evaluate the selected implementation method.

The configuration of high-level synthesis device 200 according to the second example embodiment of the present invention has been described. The operation of high-level synthesis device 200 according to the present example embodiment will now be described.

Figure 9:
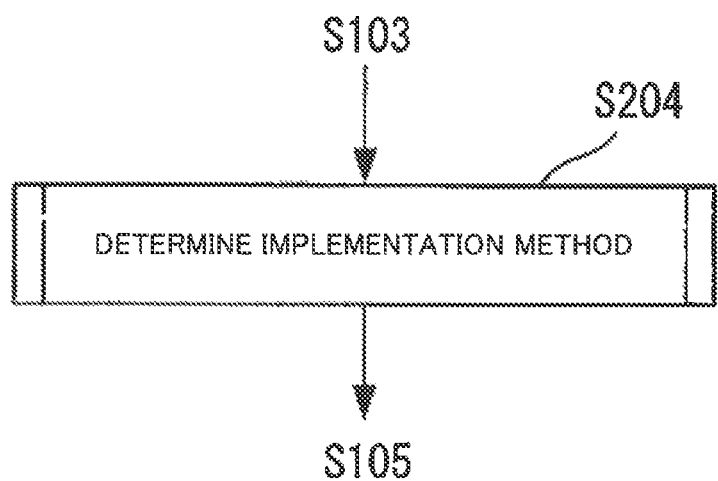
FIG. 9 is a flowchart showing a flow of processing different from the high-level synthesis processing according to the first example embodiment among the high-level synthesis processing es according to the second example embodiment.

High-level synthesis device 200 according to the present example embodiment executes a high-level synthesis processing similarly to the high-level synthesis device 100 according to the first example embodiment. As shown in FIG. 9, the high-level synthesis processing according to the present example embodiment is almost the same as the high-level synthesis processing according to the first example embodiment except that it includes an implementation method determination processing (step S204) instead of the implementation method determination processing (step S104) It is almost the same as this high-level synthesis processing.

Figure 10:
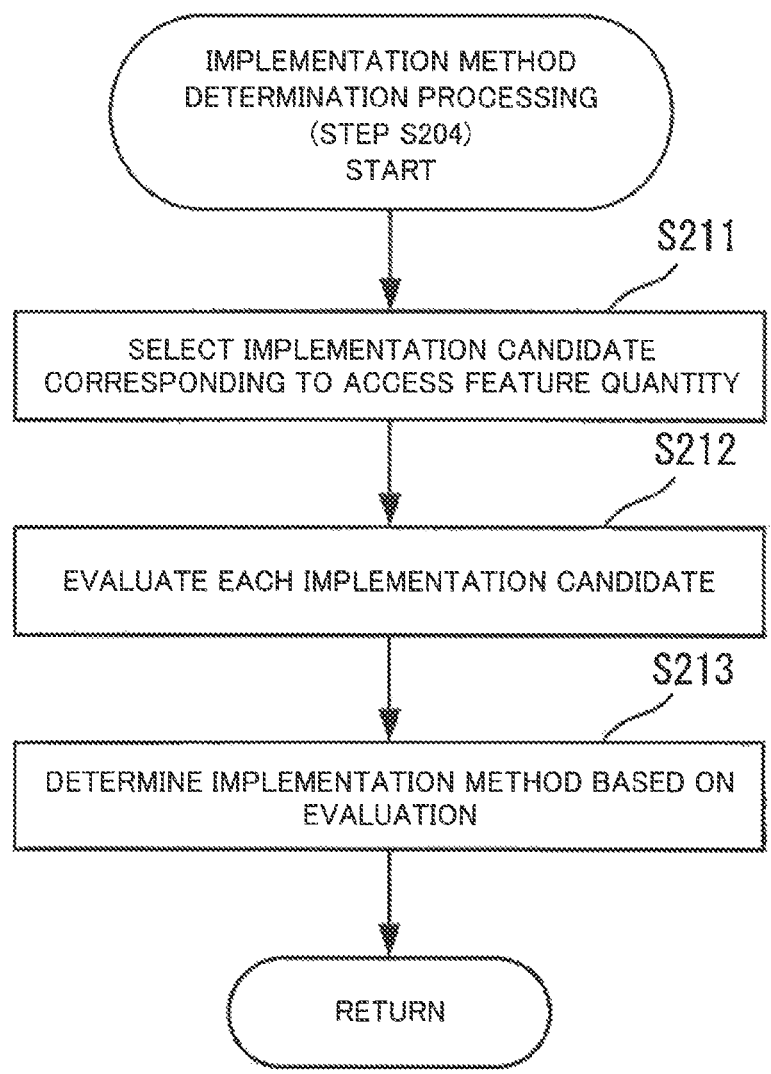
FIG. 10 is a flowchart showing details of implementation method determination processing shown in FIG. 9.

In the implementation method determination processing (step S204), as shown in FIG. 10, candidate selection unit 212 selects the implementation method corresponding to the access feature quantity obtained in step S102 (step S211). Specifically, using an access feature quantity included in candidate data 109 as a determination criterion, candidate selection unit 212 selects, from among a plurality of implementation candidates obtained by the candidate obtaining unit 104, an implementation method corresponding to the obtained access feature quantity.

When a plurality of implementation methods is selected from among implementation candidates, candidate evaluation unit 213 evaluates each of the selected implementation methods with respect to the performance of the predetermined communication (step S212).

Here, the evaluation is performed by obtaining an index indicating the performance of communication based on, for example, a simple simulation or a result actually implemented and operated.

Communication path determination unit 110 and I/F determination unit 111 determine the implementation method based on the result evaluated by candidate evaluation unit 213 (step S213). Specifically, communication path determination unit 110 and I/F determination unit 111 determine the communication path and the interface from which the best evaluation results are obtained as a result of evaluation by candidate evaluation unit 213. As a result, communication path determination unit 110 and I/F determination unit 111 end the implementation method determination processing (step S204).

As described above, in the second example embodiment of the present invention, in the case where a plurality of implementation methods are selected from among implementation candidates based on the access feature quantity obtained, each is evaluated for the performance of a predetermined communication. Then, the implementation method is determined based on the evaluated result. Therefore, by appropriately selecting the evaluation method, it is possible to determine an implementation method with the best performance. Therefore, similarly to the example embodiment 1, it is possible to improve performance related to communication such as reduction of access latency in communication between a plurality of modules.

Third Example Embodiment

In the present example embodiment, the high-level synthesis device outputs a result determined by implementation determination unit 105.

Figure 11:
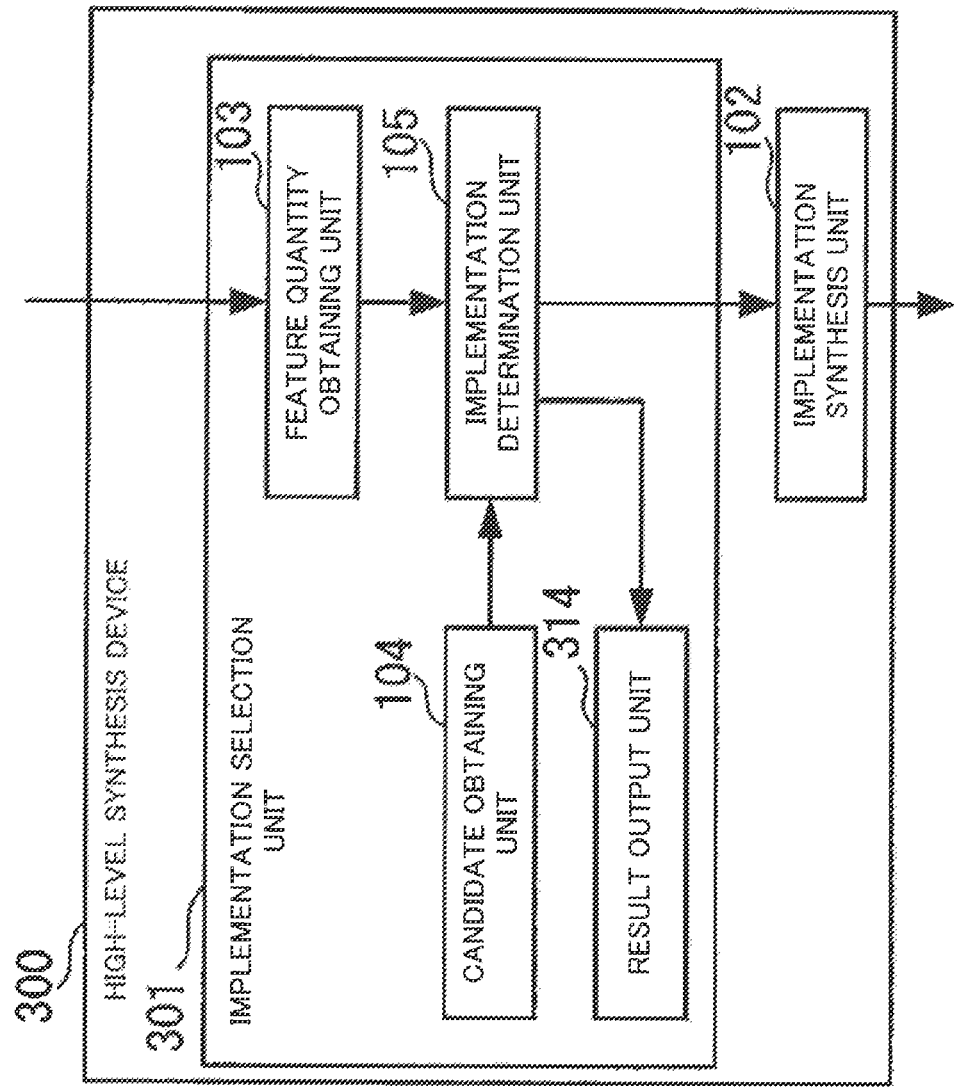
FIG. 11 shows a functional configuration of a high-level synthesis device according to a third example embodiment of the present invention.

As shown in FIG. 11, high-level synthesis device 300 according to the present example embodiment has implementation selection unit 301 in place of the implementation selection unit 101 according to the first example embodiment, implementation synthesis unit 102 similar to the first example embodiment. Implementation selection unit 301 according to the present example embodiment has result output unit 314 in addition to the configuration of the implementation selection unit 101 according to the first example embodiment.

Result output unit 314 outputs the result determined by implementation determination unit 105. The output of result in the present example embodiment is an output to user, and typically it is to display the result on a display unit (not shown) such as a liquid crystal panel, a display.

The configuration of high-level synthesis device 300 according to the third example embodiment of the present invention has been described. The operation of high-level synthesis device 300 according to the present example embodiment will now be described.

Figure 12:
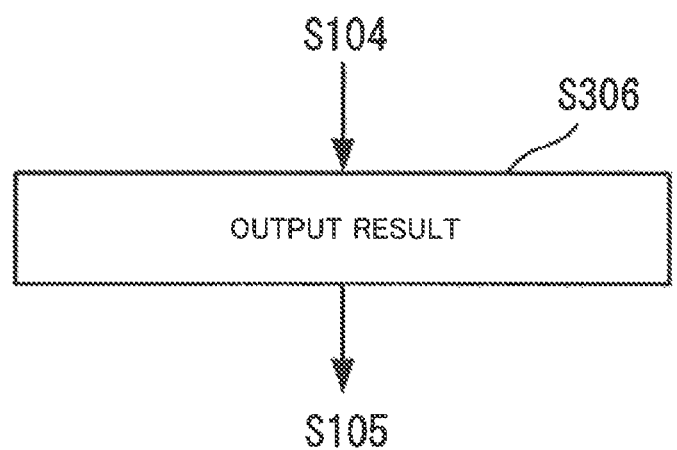
FIG. 12 is a flowchart showing a flow of processing different from the high-level synthesis processing according to the first example embodiment among the high-level synthesis processing es according to the third example embodiment.

High-level synthesis device 300 according to the present example embodiment executes high-level synthesis processing like high-level synthesis device 100 according to the first example embodiment. As shown in FIG. 12, the high-level synthesis processing according to the present example embodiment includes result output processing (step S306) between step S104 and step S105. Except for this, the high-level synthesis processing according to the present example embodiment is generally similar to the high-level synthesis processing according to the first example embodiment.

Result output unit 314 outputs the result determined by the implementation determination unit 105 (step S306). In the present example embodiment, the result is displayed on the display unit (not shown). An example of the configuration of the synthesis result screen displayed here is shown in FIG. 13.

As shown in the figure, synthesis result screen 315 includes detailed synthesis result information 316 indicating information on the determined implementation method, access feature quantity information 317 indicating the access feature quantity obtained in step S104, and candidate information 318 indicating a list of implementation candidates other than the determined implementation method. Detailed synthesis result information 316 includes, for example, a relationship with the access feature quantity, an evaluation result of the effect, and the like as the information to be the basis of the selection.

As explained above, in the third example embodiment of the present invention, the result determined by implementation determination unit 105 is output. Therefore, a user can see what kind of information gained the synthesis result, the basis for obtaining the synthesis result. This makes it possible for the user to easily check whether there is a difference between the assumption beforehand and the result.

If there is a difference between the assumption and the result and implementation determination unit 105 can accept the instruction of the user as described in the first example embodiment, the user can intentionally obtain different results by giving instructions.

Fourth Example Embodiment

In the present example embodiment, feature quantity obtaining unit 103 obtains a plurality of access feature quantities. A plurality of implementation methods respectively corresponding to the feature types included in the plurality of access feature quantities are determined from the plurality of implementation candidates obtained by candidate obtaining unit 104.

Figure 14:
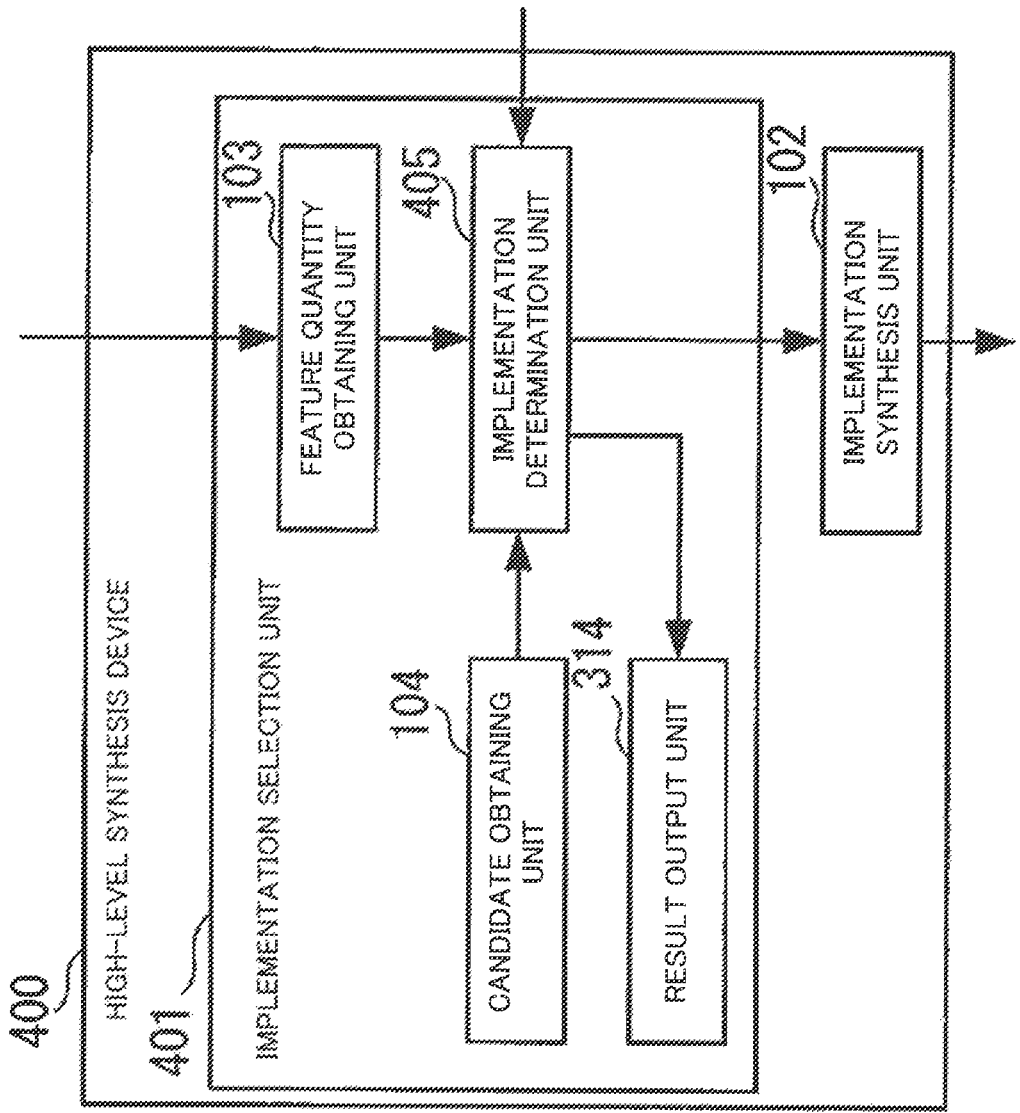
FIG. 14 is a diagram showing a functional configuration of a high-level synthesis device according to a fourth example embodiment of the present invention.

As shown in FIG. 14, high-level synthesis device 400 according to the present example embodiment has implementation selection unit 401 in place of implementation selection unit 301 according to the third example embodiment, and has implementation synthesis unit 102 similar to that of the first example embodiment.

Implementation selection unit 401 according to the present example embodiment has implementation determination unit 405 that replaces the implementation determination unit 105 of implementation selection unit 301 according to the third example embodiment. Except for this point, implementation selection unit 401 according to the present example embodiment has a configuration substantially similar to implementation selection unit 301 according to the third example embodiment.

Implementation determination unit 405 determines a plurality of implementation methods respectively corresponding to the feature types included in the plurality of access feature quantities from the plurality of implementation candidates obtained by the candidate obtaining unit 104.

The configuration of high-level synthesis device 400 according to the fourth example embodiment of the present invention has been described. The operation of high-level synthesis device 400 according to the present example embodiment will now be described.

Figure 15:
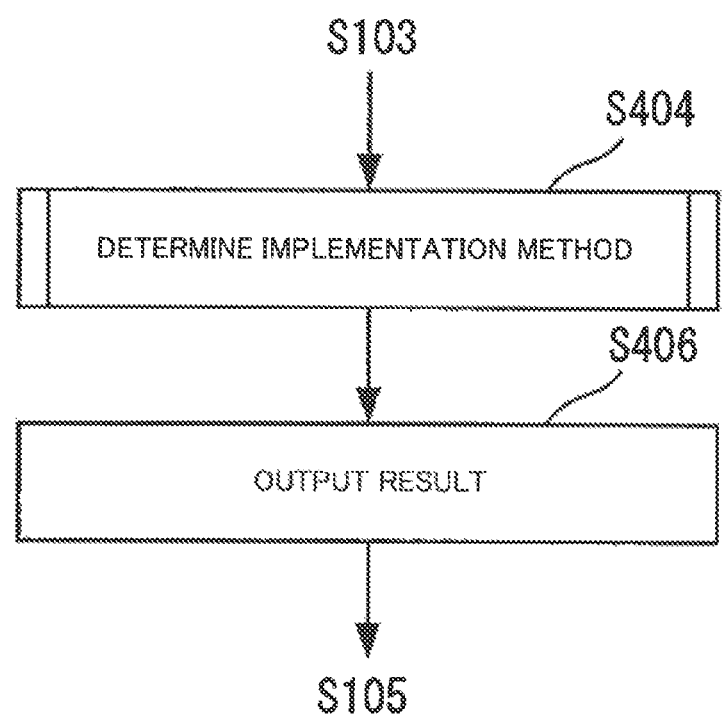
FIG. 15 is a flow chart showing a flow of processing different from the high-level synthesis processing according to the first example embodiment among the high-level synthesis processing es according to the fourth example embodiment.

High-level synthesis device 400 according to the present example embodiment executes high-level synthesis processing similarly to high-level synthesis device 300 according to the third example embodiment. As shown in FIG. 15, the high-level synthesis processing according to the present example embodiment includes implementation method determination processing (step S404) and result display processing (step S406) instead of the implementation method determination processing (step S104) and the result display processing (step S306). Except for this, the high-level synthesis processing according to the present example embodiment is almost the same as the high-level synthesis processing according to the third example embodiment.

Figure 16:
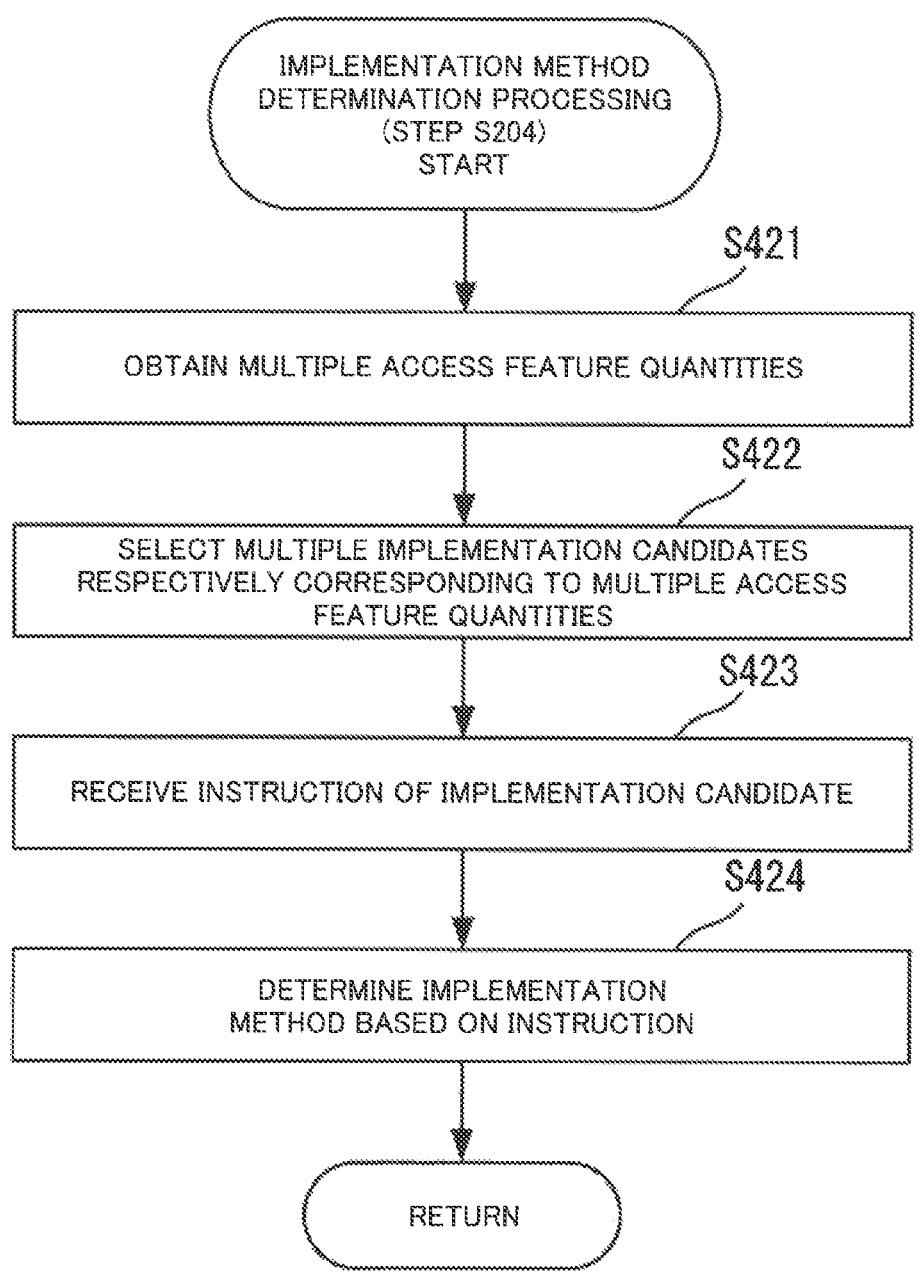
FIG. 16 is a flowchart showing details of implementation method determination processing shown in FIG. 15.

As shown in FIG. 16, in the implementation method determination processing (step S404), implementation determination unit 405 obtains a plurality of access feature quantities from the feature quantity obtaining unit 103 (step S421). The feature types included in the plurality of access feature quantities obtained here may be different.

Implementation determination unit 405 selects a plurality of implementation methods respectively corresponding to the feature types included in the plurality of access feature quantities from the plurality of implementation candidates obtained by the candidate obtaining unit 104 (step S422).

Specifically, for example, when a plurality of access feature quantities is obtained, an implementation candidate is selected and output for each feature type. That is, when N access feature quantities are input, the number of selected implementation candidates is N at most. The access feature quantity obtained by combining multiple access feature quantities shall also be counted as one.

Here, result output unit 314 according to the present example embodiment may display a list of a plurality of selected implementation methods on a display unit (not shown). The plurality of selected implementation methods may be displayed in association with corresponding access feature quantities.

Implementation determination unit 405 receives an instruction of the user for specifying any one of the plurality of implementation methods (step S423).

Implementation determination unit 405 determines the implementation method based on the instruction of the user (step S424).

Specifically, implementation determination unit 405 determines one implementation method out of the plurality of implementation methods selected in step S422 based on an instruction from the user. As a result, implementation determination unit 405 ends the implementation method determination processing (step S404).

Result output unit 314 separately displays implementation method determined in step S424 and the plurality of implementation methods selected in step S422 in addition to the implementation method (step S406). The screen displayed here may include all or part of the information contained in synthesis result screen 315 exemplified in FIG. 13.

As explained above, in the fourth example embodiment of the present invention, feature quantity obtaining unit 103 obtains a plurality of access feature quantities. A plurality of implementation methods respectively corresponding to the feature types included in the plurality of access feature quantities are determined based on the instruction of the user from the plurality of implementation candidates obtained by the candidate obtaining unit 104.

As a result, the user can select a desired implementation method by confirming options from plural implementation methods narrowed down from a plurality of implementation candidates based on a plurality of access feature quantities. Therefore, interactive high-level synthesis device 400 can be provided.

Specific Example 1

Figure 17:
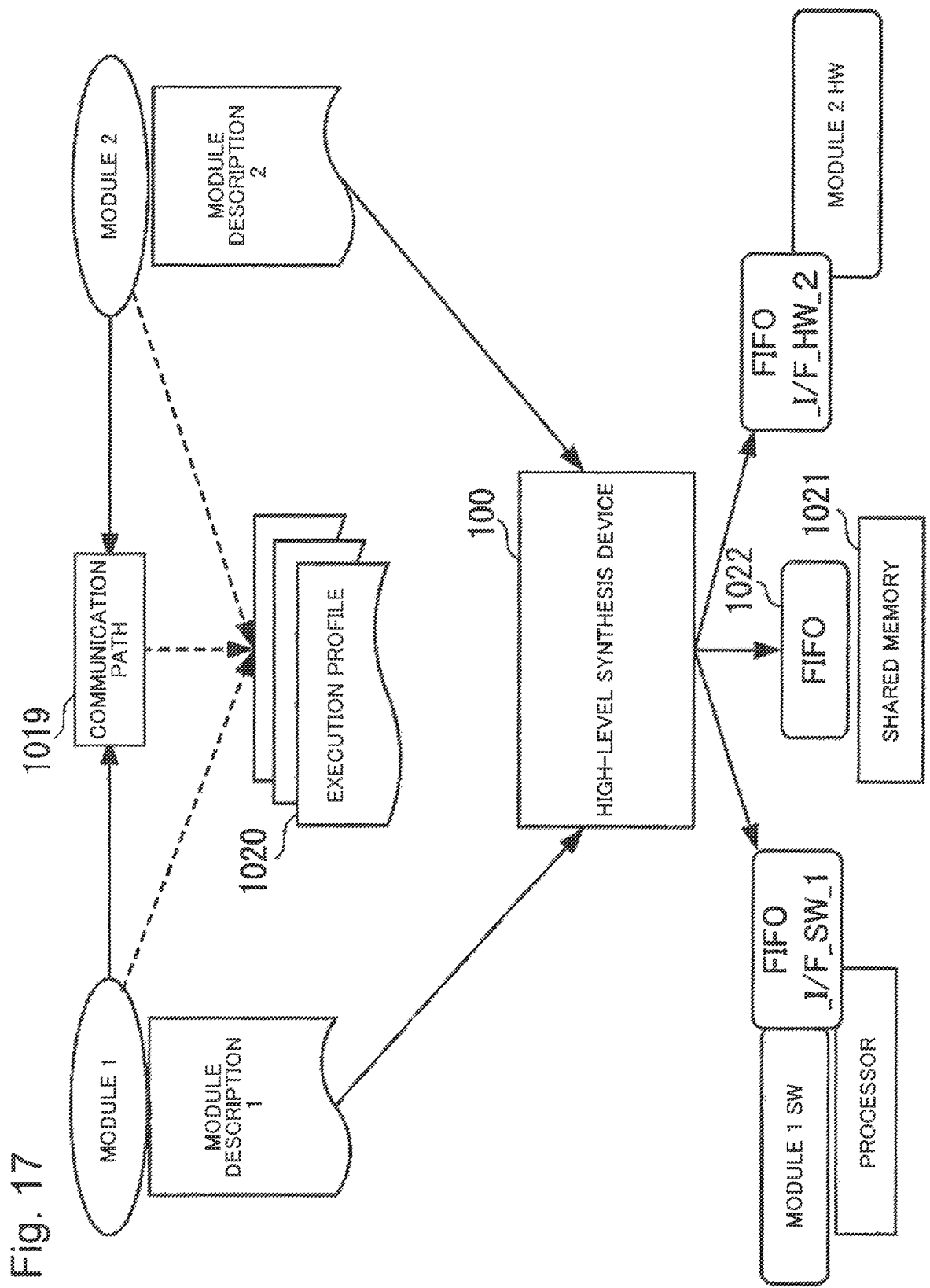
FIG. 17 shows a configuration of one specific example of a high-level synthesis device according to the first example embodiment of the present invention.
Figure 18:
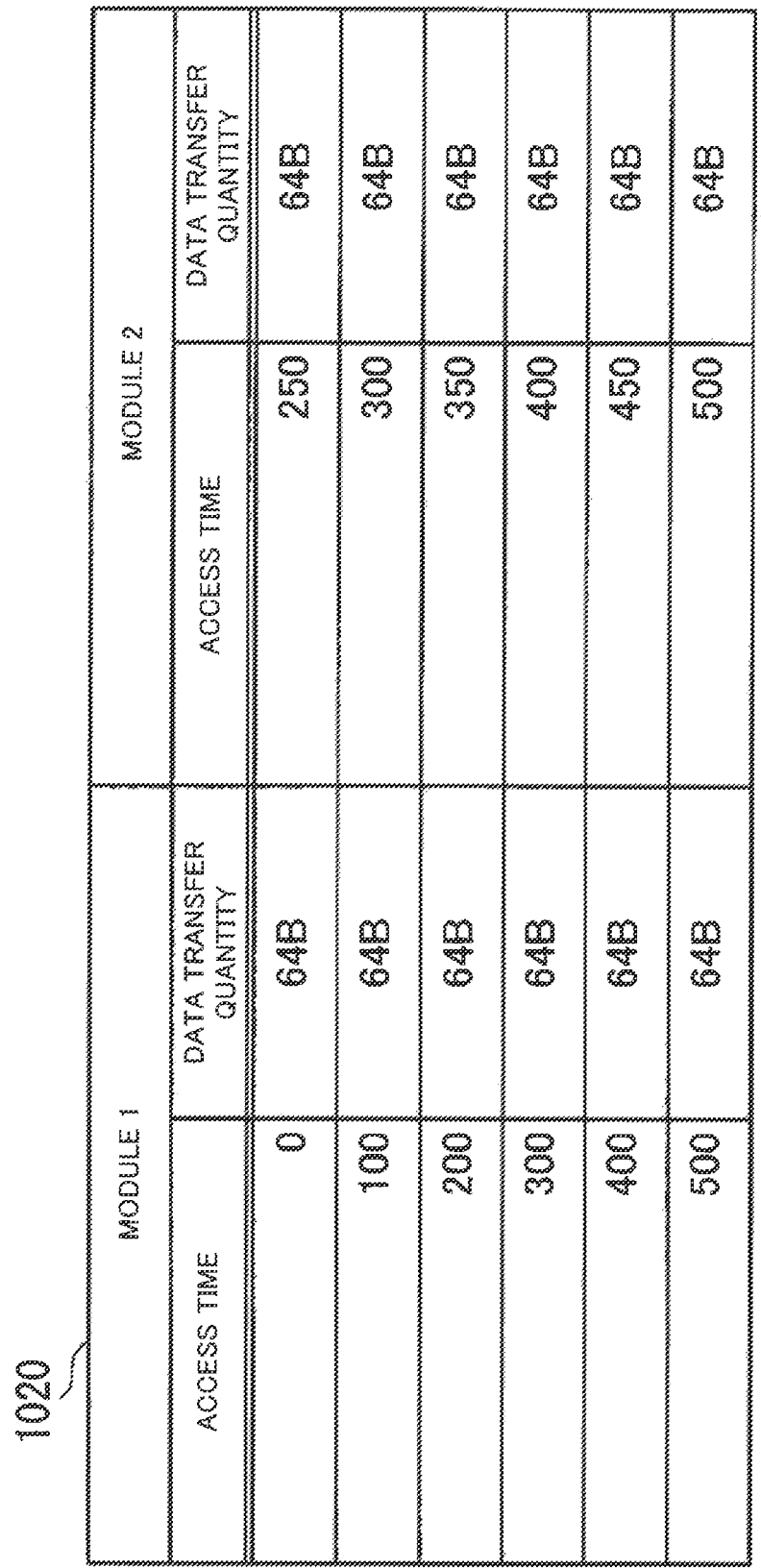
FIG. 18 shows an example of an execution profile.

With reference to FIGS. 17 and 18, an example of usage of high-level synthesis device 100 according to the first example of the present invention will be described as a first specific example. That is, high-level synthesis device 100 shown in FIG. 17 has a functional configuration as shown in FIG. 1.

As shown in FIG. 17, execution profile 1020 of modules 1 and 2, which are applications program which communicate via the communication path 1019, is input data to the high-level synthesis device 100. Module 1 and module 2 are described by module description 1 and module description 2, respectively.

Execution profile 1020 is a profile including a log of access to communication path 1019. In execution profile 1020, for example, the access time to communication path 1019 and the data transfer amount are recorded in the format shown in FIG. 18. In the example of FIG. 18, the access time is indicated by the elapsed time from the reference time (its unit is, for example, microseconds).

FIG. 17 shows an example in which as a result of high-level synthesis, module 1SW is implemented as a software (SW) module executed on the processor, and module 2HW is implemented as a hardware (HW) module.

That is, feature quantity obtaining unit 103 receives execution profile 1020 including information as illustrated in FIG. 18, and obtains the access feature quantity. From execution profile 1020 illustrated in FIG. 18, for example, the feature quantity corresponding to the access frequency F is obtained as follows.

Access frequency $F1$ of module $1=1\div$(average of access time difference)$=1\div100=0.01$ Access frequency $F2$ of module $2=1\div$(average of access time difference)$=1\div50=0.02$ Candidate obtaining unit 104 may be implemented as implementation candidate DB (data base). Implementation candidate DB stores in advance all implementation candidates that can be adopted. Then, implementation candidate DB outputs, out of the implementation candidates held therein, all implementation candidates that can be adopted for the module to be synthesized.

Candidate obtaining unit 104 obtains the implementation candidate by collating the access frequencies F1 and F2, as the feature quantities, with the implementation candidate included in the candidate data shown in FIG. 3, for example.

In the example of FIG. 17, the FIFO is determined as the configuration for realizing the communication path. In addition, FIFO_I/F_SW_1 and FIFO_I/F_HW_2 are determined as the interfaces implemented in the module SW1 and the module 2HW, respectively.

The process of determining FIFO_I/F_SW_1 will be explained. First, it can be seen that when, from the table of FIG. 3, the FIFO is determined for the communication path, the options of the interface to be implemented include FIFO_I/F_SW_1 and FIFO_I/F_SW_2. Since the feature quantity F1 is 0.01, FIFO_I/F_SW_1 associated with "range" including 0.01 is determined as an interface satisfying the condition.

Like FIFO_I/F_SW_1, FIFO_I/F_HW_1 is also determined based on the fact that the communication path is a FIFO and the feature quantity F2 is 0.02.

Based on the result that high-level synthesis device 100 has determined in this way, high-level synthesis is realized as shown in FIG. 17. That is, the communication path connecting the software module and the hardware module is realized as FIFO 1022 on the shared memory 1021. FIFO_I/F_SW_1 which is an interface implemented by the software module is realized together with the module 1SW as software program executed by the processor. FIFO_I/F_HW_2 is realized as a part of module 2HW.

Specific Example 2

Figure 19:
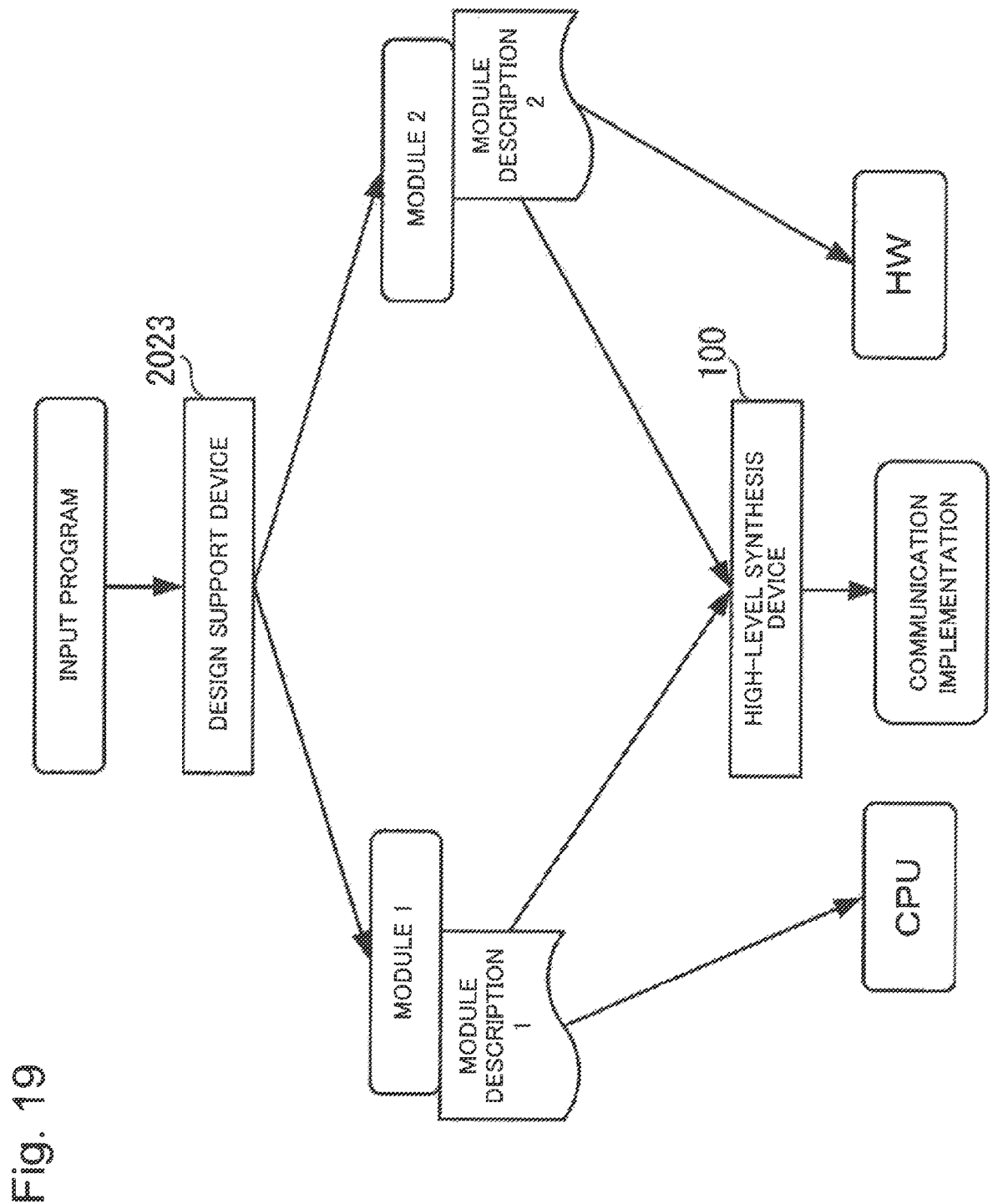
FIG. 19 is a diagram showing another specific example in which the high-level synthesis device according to the first example embodiment of the present invention and a design support device are integrated.

High-level synthesis device 100 according to the first example of the present invention can be integrated with the design support device 2023 as shown in FIG. 19. In the figure, the CPU represents a central processing unit, and HW represents hardware. Module 1 is a module realized by executing software program (module description 1) in the CPU. Module 2 is a module realized by hardware and can be described by module description 2. The "communication implementation" in the figure corresponds to a connection method for communicating between a plurality of modules.

Design support device 2023 is a device that searches for the optimum placement of processing and data in consideration of the communication bus bandwidth between the CPU and the accelerator based on the input program written in a high-level language, for example.

It should be noted that such integration can also be adopted for high-level synthesis devices 200, 300, and 400 according to other example embodiments.

Figure 20:
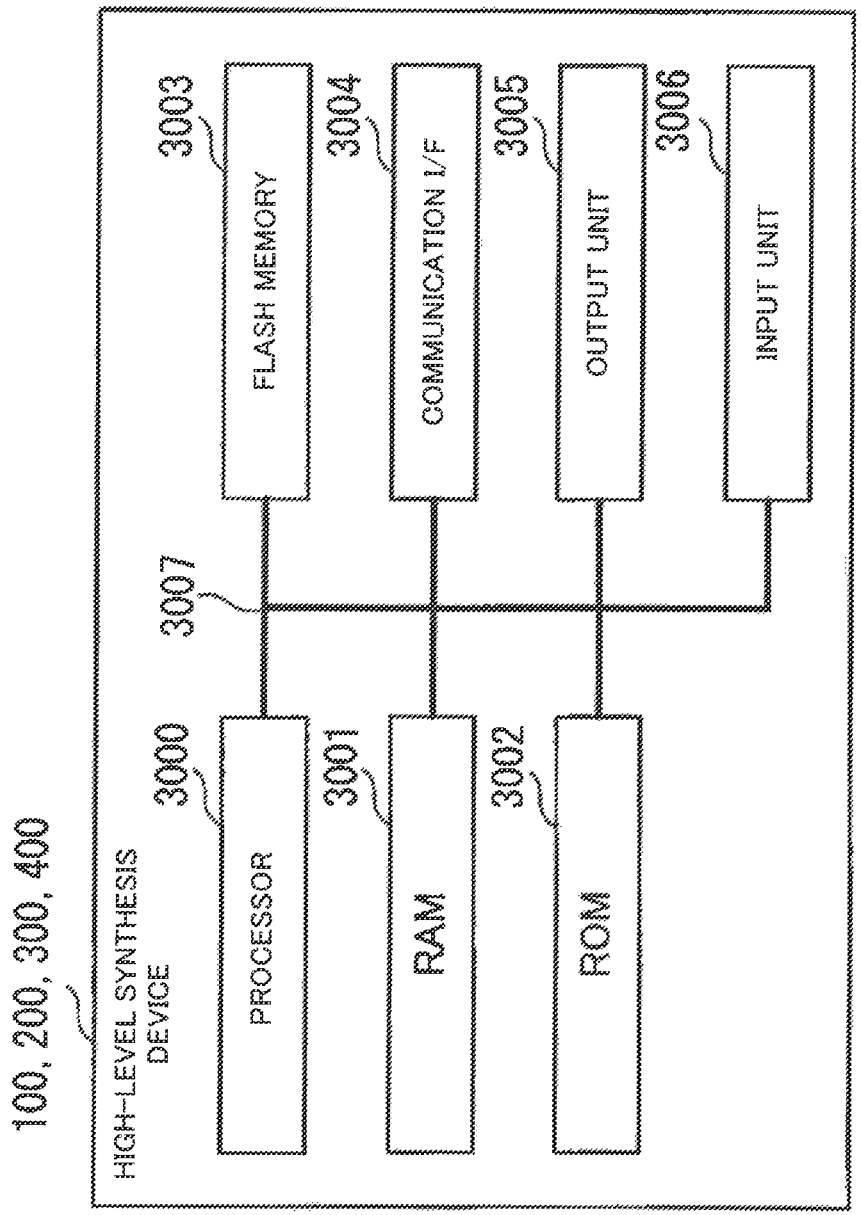
FIG. 20 is a diagram showing an example of a physical configuration of the high-level synthesis device according to the first to fourth example embodiments of the present invention.

High-level synthesis devices 100, 200, 300 and 400 physically, as illustrated in FIG. 20, have such as, processor 3000, RAM (Random Access Memory) 3001, ROM (Read Only Memory) 3002, flash memory 3003, communication I/F 3004, output unit 3005, input unit 3006, internal bus 3007 connecting the elements 3000 to 3006. Output unit 3005 is, for example, a liquid crystal display panel, an organic EL (electroluminescence) display. Input unit 3006 is, for example, a keyboard, a mouse, a touch panel.

The functions of high-level synthesis devices 100, 200, 300, and 400 are realized by processor 3000 executing, for example, software•program as a work area such as RAM 3001. This software program is prestored in, for example, flash memory 3003.

The functions exerted by high-level synthesis devices 100, 200, 300, and 400 may be realized by, for example, a dedicated device or a combination of a dedicated device and a computer that executes software•program.

Although the example embodiment and variations of the present invention have been described above, the present invention is not limited thereto. For example, the present invention includes a form in which some or all of the example embodiments and variations described so far are appropriately combined, and a form made by modifying the form as necessary.

Some or all of the above example embodiments may also be described as Supplementary note shown below, but are not limited to the following.

(Supplementary Note 1)

A high-level synthesis device including:

a feature quantity obtaining means for obtaining an access feature quantity including a feature quantity relating to communication between a plurality of modules by analyzing an access pattern in communication between the plurality of modules; and an implementation determination means for determining an implementation method for communicating between the plurality of modules based on the obtained access feature quantity.

(Supplementary Note 2)

The high-level synthesis device according to Supplementary note 1, wherein the plurality of modules includes a module implemented by software.

(Supplementary Note 3)

The high-level synthesis device according to Supplementary note 1 or 2, wherein the feature quantity obtaining means analyzes the access pattern based on a profile for each of the plurality of modules, thereby obtaining the access feature quantity.

(Supplementary Note 4)

The high-level synthesis device according to any one of Supplementary notes 1 to 3, wherein the feature quantity is a difference in access frequency between the modules.

(Supplementary Note 5)

The high-level synthesis device according to any one of Supplementary notes 1 to 4, further including a candidate obtaining means for obtaining an implementation candidate which is a candidate of an implementation method for communicating between the plurality of modules, wherein the implementation determination means determines the implementation method from among the obtained implementation candidates.

(Supplementary Note 6)

The high-level synthesis device according to Supplementary note 5, wherein the access feature quantity includes a feature type which is a type of a feature relating to communication between the plurality of modules and a feature quantity which is a value corresponding to the feature type, the feature quantity obtaining means obtains a plurality of access feature quantities differing in the feature type, the candidate obtaining means obtains a plurality of implementation candidates, and the implementation determination means determines a plurality of implementation methods respectively corresponding to the feature types included in the plurality of obtained access feature quantities from among the plurality of obtained implementation candidates.

(Supplementary Note 7)

The high-level synthesis device according to Supplementary note 5 or 6, wherein the implementation method for communicating between the plurality of modules includes a communication path between the plurality of modules and an interface implemented in each of the plurality of modules, the candidate obtaining means includes:

first obtaining means for finding a candidate of the communication path; and second obtaining means for obtaining a candidate of the interface, the implementation determination means includes:

first determination means for determining the communication path implemented for communicating between the plurality of modules from among the candidates of the communication paths, and second determination means for determining the interface implemented for communicating between the plurality of modules from among the candidates of the interfaces.

(Supplementary Note 8)

The high-level synthesis device according to any one of Supplementary notes 5 to 7, wherein where the implementation determination means determines the plurality of implementation methods from among the obtained implementation candidates based on the obtained access feature quantity, the implementation determination means evaluates each of the plurality of selected implementation methods with regard to a predetermined performance of communication, and the implementation determination means determines the implementation method based on the evaluated result.

(Supplementary Note 9)

The high-level synthesis device according to any one of Supplementary notes 1 to 8, further including a result output means for outputting a result determined by the implementation determination means.

(Supplementary Note 10)

A high-level synthesis method including:

obtaining an access feature quantity including a feature quantity for communication between a plurality of modules by analyzing the access pattern in the communication between the plurality of modules; and determining the implementation method for communication between the plurality of modules based on the obtained access feature quantity.

(Supplementary Note 11)

A program recording medium for causing a computer to function as:

feature quantity obtaining means for obtaining an access feature quantity including a feature quantity for communication between a plurality of modules by analyzing the access pattern in the communication between the plurality of modules; and implementation determination means for determining the implementation method for communication between the plurality of modules based on the obtained access feature quantity.

Although the present application invention has been described with reference to example embodiments, the present application invention is not limited to the above example embodiment. In the configuration and details of the present application invention, various modifications that one skilled in the art can understand can be made within the scope of the present application invention.

INDUSTRIAL APPLICABILITY

The present invention can be used to realize a program for realizing by a computer, an information processing device and an information processing device which communicate by mutually exchanging data between modules that execute processing. For example, the present invention can be usefully used for an information processing device including a module realized by software and a module realized by hardware and a program for realizing an information processing device with a computer.

REFERENCE SIGNS LIST 100, 200, 300, 400 high-level synthesis device
101, 201, 301, 401 implementation selection unit
102 implementation synthesis unit
103 feature quantity obtaining unit
104 candidate obtaining unit
105, 205, 405 implementation determination unit
106 communication path obtaining unit
107 I/F obtaining unit
108 candidate storage unit
109 candidate data
110 communication path determination unit
111 I/F determination unit
212 candidate selection unit
213 candidate evaluation unit
314 result output unit
315 synthesis result screen
316 detailed synthesis result information
317 access feature quantity information
318 candidate information
1019 communication path
1020 execution profile
1021 shared memory
1022 FIFO
2023 design support device
3000 processor
3001 RAM
3002 ROM
3003 flash memory
3004 communication I/F
3005 output unit
3006 input unit
3007 internal bus

The invention claimed is:

1. A high-level synthesis device comprising:
a memory and one or more processors executing a program loaded on the memory, wherein
the processors are configured to function as:
a feature quantity obtaining unit for obtaining an access feature quantity including a feature quantity relating to communication between a plurality of modules by analyzing an access pattern in communication between the plurality of modules; and
an implementation determination unit for determining an implementation method for communicating between the plurality of modules based on the obtained access feature quantity,
a candidate obtaining unit for obtaining an implementation candidate which is a candidate of an implementation method for communicating between the plurality of modules,
wherein the implementation determination unit determines the implementation method from among the obtained implementation candidates;
wherein the access feature quantity includes a feature type which is a type of a feature relating to communication between the plurality of modules and a feature quantity which is a value corresponding to the feature type,
the feature quantity obtaining unit obtains a plurality of access feature quantities differing in the feature type,
the candidate obtaining unit obtains a plurality of implementation candidates, and
the implementation determination unit determines a plurality of implementation methods respectively corresponding to the feature types included in the plurality of obtained access feature quantities from among the plurality of obtained implementation candidates.

2. The high-level synthesis device according to claim 1, wherein the plurality of modules includes a module implemented by software.

3. The high-level synthesis device according to claim 1, wherein the feature quantity obtaining unit analyzes the access pattern based on a profile for each of the plurality of modules, thereby obtaining the access feature quantity.

4. The high-level synthesis device according to claim 1, wherein the feature quantity is a difference in access frequency between the modules.

5. The high-level synthesis device according to claim 1, wherein the implementation method for communicating between the plurality of modules includes a communication path between the plurality of modules and an interface implemented in each of the plurality of modules,
the candidate obtaining unit includes:
first obtaining unit for finding a candidate of the communication path; and
second obtaining unit for obtaining a candidate of the interface,
the implementation determination unit includes:
first determination unit for determining the communication path implemented for communicating between the plurality of modules from among the candidates of the communication paths, and
second determination unit for determining the interface implemented for communicating between the plurality of modules from among the candidates of the interfaces.

6. The high-level synthesis device according to claim 1, wherein where the implementation determination unit determines the plurality of implementation methods from among the obtained implementation candidates based on the obtained access feature quantity, the implementation determination unit evaluates each of the plurality of selected implementation methods with regard to a predetermined performance of communication, and
the implementation determination unit determines the implementation method based on the evaluated result.

7. The high-level synthesis device according to claim 1, the processors are further configured to function as a result output unit for outputting a result determined by the implementation determination unit.

8. A computer-implemented high-level synthesis process, comprising:
obtaining an access feature quantity including a feature quantity for communication between a plurality of modules by analyzing an access pattern in the communication between the plurality of modules;
determining an implementation method for communication between the plurality of modules based on the obtained access feature quantity, and obtaining an implementation candidate which is a candidate of an implementation method for communicating between the plurality of modules,
    wherein the implementation method is determined from among the obtained implementation candidates;
    wherein the access feature quantity includes a feature type which is a type of a feature relating to communication between the plurality of modules and a feature quantity which is a value corresponding to the feature type,
    wherein the obtaining an access feature quantify comprises obtaining a plurality of access feature quantities differing in the feature type,
    wherein the obtaining an implementation candidate obtains a plurality of implementation candidates, and
    wherein the determining the implementation method determines a plurality of implementation methods respectively corresponding to the feature types included in the plurality of obtained access feature quantities from among the plurality of obtained implementation candidates.

9. A non-transitory computer readable storage medium storing program for causing a computer to execute:
    obtaining an access feature quantity including a feature quantity for communication between a plurality of modules by analyzing an access pattern in the communication between the plurality of modules;
    determining an implementation method for communication between the plurality of modules based on the obtained access feature quantity; and
    obtaining an implementation a candidate which is a candidate of an implementation method for communicating between the plurality of modules,
        wherein the implementation method is determined from among the obtained implementation candidates;
        wherein the access feature quantity includes a feature type which is a type of a feature relating to communication between the plurality of modules and a feature quantity which is a valve corresponding to the feature type,
        wherein the obtaining an access feature quantify comprises obtaining a plurality of access features quanitites differing in the feature type,
        wherein the obtaining an implementation candidate obtains a plurality of implementation candidates, and
        wherein the determining the implementation method determines of a plurality of implementation methods respectively corresponding to the feature types included in the plurality of obtained access feature quantities from among the plurality of implementation candidates.

10. The high-level synthesis device according to claim 2, wherein the feature quantity obtaining unit analyzes the access pattern based on a profile for each of the plurality of modules, thereby obtaining the access feature quantity.

11. The high-level synthesis device according to claim 2, wherein the feature quantity is a difference in access frequency between the modules.

12. The high-level synthesis device according to claim 3, wherein the feature quantity is a difference in access frequency between the modules.

13. The high-level synthesis device according to claim 2, the processors are further configured to function as
    a candidate obtaining unit for obtaining an implementation candidate which is a candidate of an implementation method for communicating between the plurality of modules,
        wherein the implementation determination unit determines the implementation method from among the obtained implementation candidates.

14. The high-level synthesis device according to claim 3, the processors are further configured to function as
    a candidate obtaining unit for obtaining an implementation candidate which is a candidate of an implementation method for communicating between the plurality of modules,
        wherein the implementation determination unit determines the implementation method from among the obtained implementation candidates.

15. The high-level synthesis device according to claim 4, the processors are further configured to function as
    a candidate obtaining unit for obtaining an implementation candidate which is a candidate of an implementation method for communicating between the plurality of modules,
        wherein the implementation determination unit determines the implementation method from among the obtained implementation candidates.

16. The high-level synthesis device according to claim 5, wherein where the implementation determination unit determines the plurality of implementation methods from among the obtained implementation candidates based on the obtained access feature quantity, the implementation determination unit evaluates each of the plurality of selected implementation methods with regard to a predetermined performance of communication, and
    the implementation determination unit determines the implementation method based on the evaluated result.

17. The high-level synthesis device according to claim 1, wherein the communication occurs over a communication path between the plurality of modules and the feature type is one of more of a communication path access frequency, a change in communication path access frequency, a communication path access frequency difference, a communication path interface access latency, a communication path interface access latency difference, and a bulk access amount.

18. The high-level synthesis device according to claim 1, further comprising an implementation synthesis unit for outputting synthesis data indicating the determined implementation method.

* * * * *